J. DANNER.
Car Seat and Couch.
No. 26,069.
Patented Nov. 8, 1859.
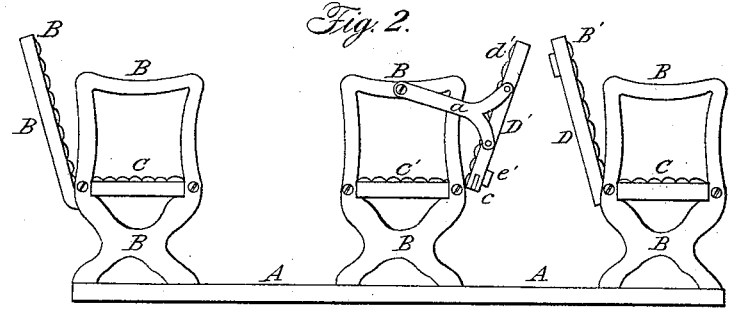
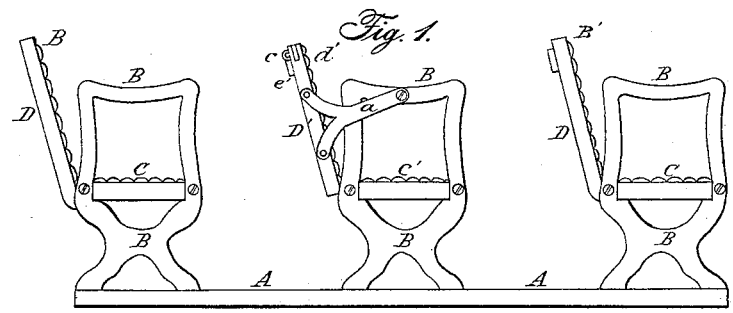
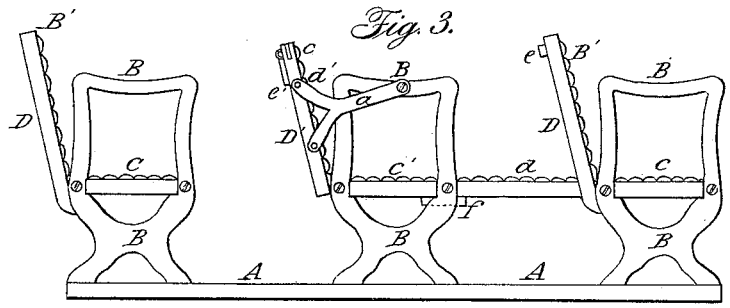
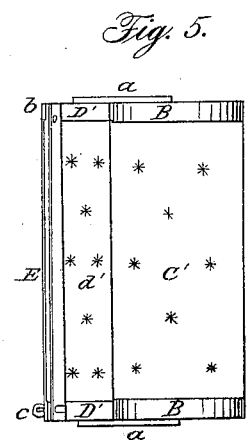
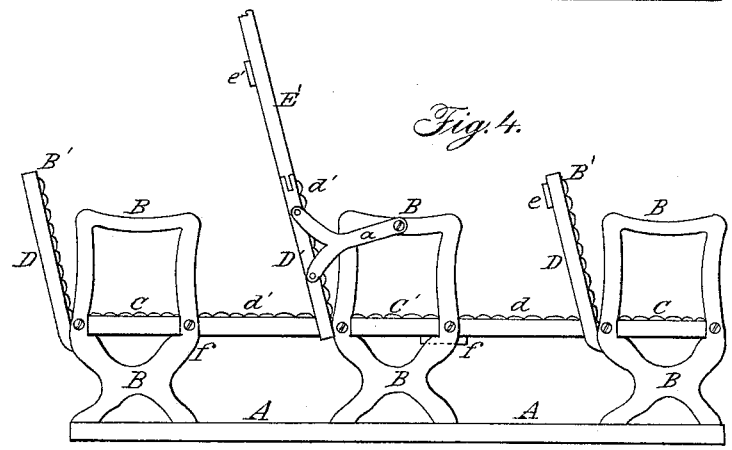
Witnesses:
John L. Adams
A. C. Widdicombs
Inventor:
John Danner
By his Attorney
Thos. H. Dodge

UNITED STATES PATENT OFFICE.

JOHN DANNER, OF CANTON, OHIO, ASSIGNOR TO HIMSELF AND J. M. JAY, OF SAME PLACE.

SLEEPING-CAR.

Specification of Letters Patent No. 26,069, dated November 8, 1859.

*To all whom it may concern:*

Be it known that I, JOHN DANNER, of Canton, in the county of Stark, in the State of Ohio, have invented certain new and useful Improvements in Sleeping-Cars; and I do hereby declare that the following is a sufficiently full and exact description thereof to enable those skilled in the art to make and use my said improvements, reference being had to the accompanying drawings, and to the letters of reference marked thereon, forming a part of this specification.

Figure 1, is an end view of three seats having my improvements attached. Fig. 2, is an end view of the same with back of middle seat reversed. Fig. 3, is an end view with false back $d$, let down. Fig. 4, is an end view with false back $d$, and middle seat back $d'$, let down; and Fig. 5, is a top or plan view of the middle seat $C'$.

A, represents the floor of the car, and B, B, the frames which support the seats C, C'.

The frames D, of the backs B', are rigidly attached to the seats C, and frames B, and are also provided with false backs $d$, hinged to the backs of seats C, and consequently capable of being let down as shown in Figs. 3 and 4, so as to rest on buttons $f$, attached to the under side of seats C'. When folded up as shown in Figs. 1 and 2, the false backs $d$, are held in place by buttons $e$, attached to the frames D. This arrangement is similar to that described in my previous application for a patent for improved sleeping car.

The middle seat C', is similar to the seats C, but the back $d'$, is hinged to one of the cross pieces of the frame D', so that it can be let down as shown in Fig. 4. The other or corresponding cross piece E, of the frame D', is pivoted at $b$, and is also attached to the frame D', at its other end by a pin or bolt $c$, see Fig. 5. The frame D', is not rigidly attached like the frames D, but is hinged to the frame B, by means of the arms $a$, so that it can be reversed—see Figs. 1 and 2.

The operation is as follows, viz. When the cars are to be used for day travel, the seats can be arranged as shown in Fig. 1, or they can be arranged as shown in Fig. 2. If the car is turned at the end of each road, then the seats can be made to front all one way, and whether the car is turned or not, the middle, or every other seat can be arranged to front either way. When the car is to be used for night travel, the seats are quickly adjusted to answer for beds or sleeping couches by simply taking out the pin $c$, and turning up the piece E, as shown in Fig. 4, and then turning down the hinged backs $d'$, of the seats C', and the false backs $d$, of the seats C, as shown in Fig. 4. The piece E, can be entirely detached in a moment by taking out the screw $b$. The piece E is also provided with a button $c'$, by which the hinged back $d'$, is held in place when used for a seat—see Fig. 1. A short bed or couch can be made for children as shown in Fig. 3, by simply letting down the false back $d$, of one seat.

I have only shown and described so much of a car as is necessary to illustrate my improvements, since any of the various arrangements for dividing and converting the upper part of the car into beds or sleeping couches can be used.

Having described my improved sleeping car, what I claim and desire to secure by Letters Patent, is:

The combination of the hinged back $d'$, with the hinged and reversible frame D', and removable piece E, constructed and arranged to operate in relation to seat C', and false back $d$, of the back, B', substantially as and for the purposes set forth.

JOHN DANNER.

Witnesses:
DANIEL GOTSHALL,
WM. WILLIAMS.